Feb. 10, 1970  J. R. DAVIS  3,495,172
ELECTRONIC CABLE INSPECTION DEVICE AND METHOD UTILIZING
AND CIRCUITS AND OR CIRCUITS
Filed March 31, 1967  3 Sheets-Sheet 1

INVENTOR.
J. RAY DAVIS,
BY
*Kimmel, Crowell & Weaver,*
ATTORNEYS.

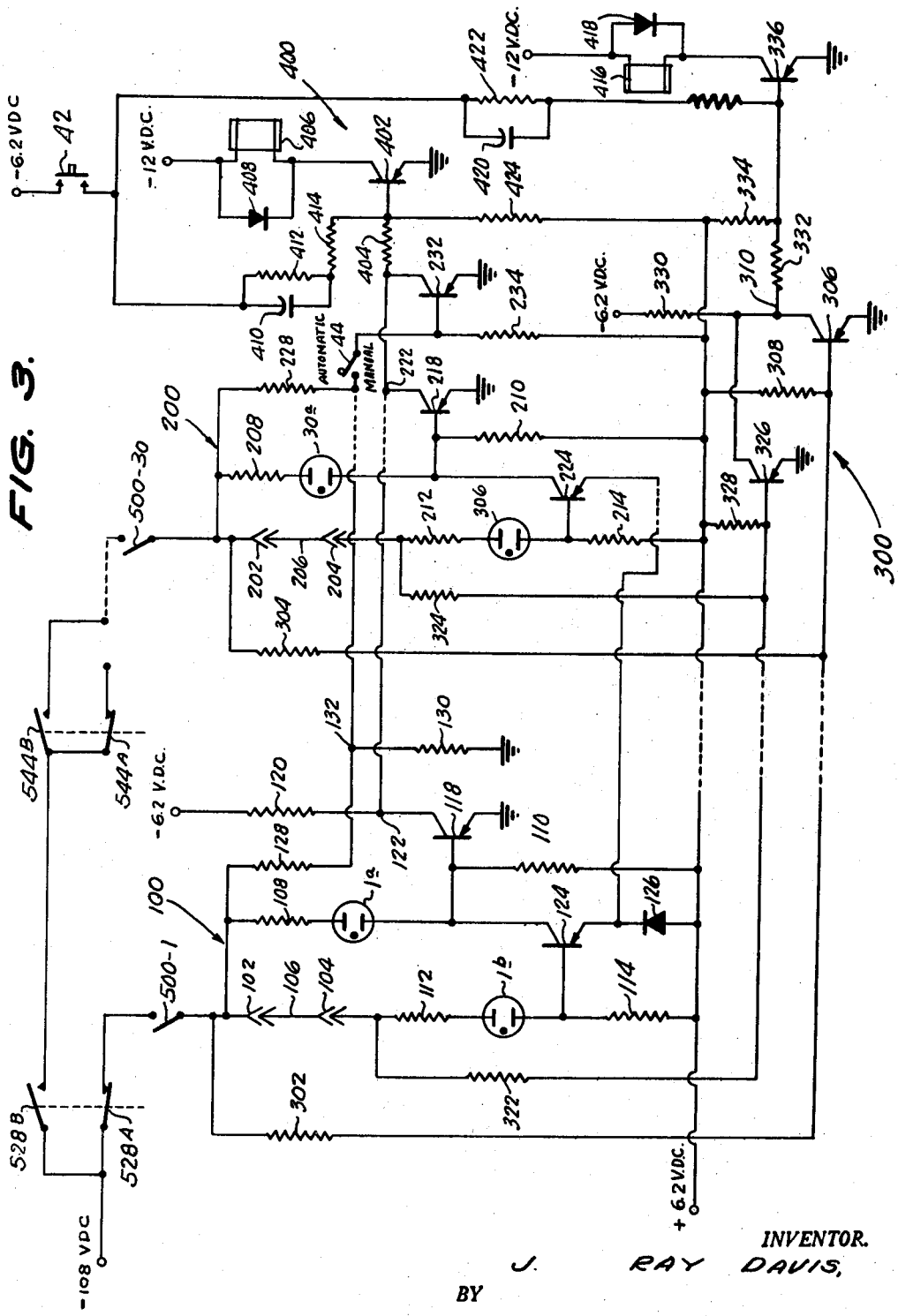

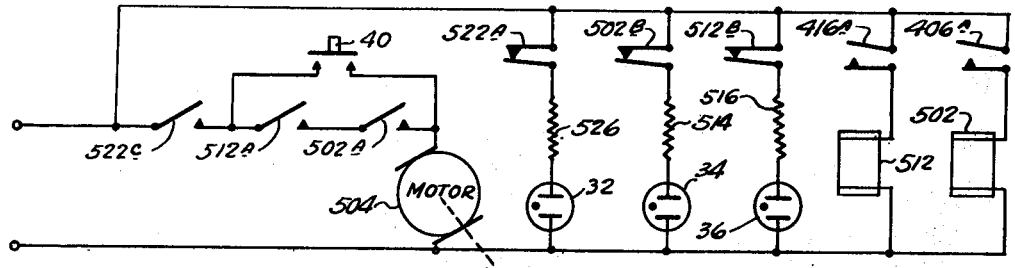
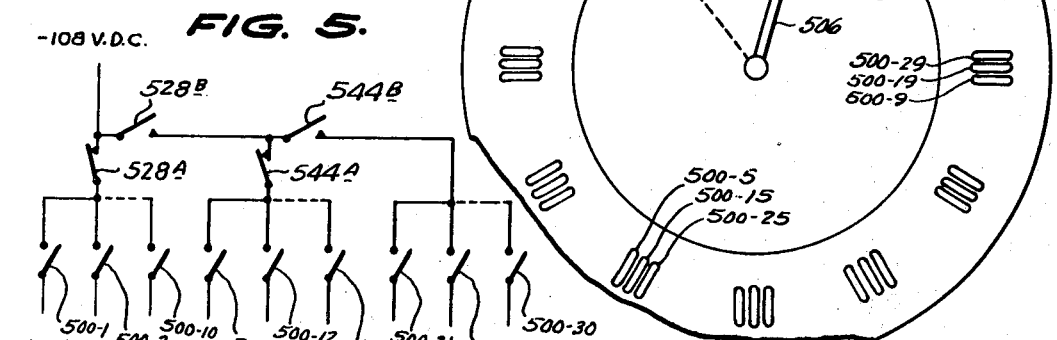

United States Patent Office 3,495,172
Patented Feb. 10, 1970

3,495,172
ELECTRONIC CABLE INSPECTION DEVICE AND METHOD UTILIZING AND CIRCUITS AND OR CIRCUITS
Jordan Ray Davis, 134 Bayway Circle, Duluth, Ga. 30136
Filed Mar. 31, 1967, Ser. No. 627,517
Int. Cl. G01r 15/12, 31/02
U.S. Cl. 324—73        17 Claims

ABSTRACT OF THE DISCLOSURE

An automatic cable testing device which sequentially applies a voltage individually to the connectors at the respective ends of the cable to be tested and has circuits for indicating a short between any two connectors at either end of the cable, an open conductor, or a crossed conductor is disclosed. AND circuits and OR circuits are used to derive the short indication and circuits are provided to stop the sequencing when a defect is found.

BACKGROUND OF THE INVENTION

Field of the invention

This invention relates to an electrical cable testing device. More particularly, this invention relates to a device for testing the continuity between the connections at the end of a multi-conductor cable, testing for shorts between connections at the ends of multi-conductor cables, testing for open circuits between the connectors of such cables and testing for crossed interconnection between the conductors at their respective ends of the multi-conductor cable.

Description of the prior art

Manual testing of multi-conductor cables is a tedious and time consuming chore and frequently requires the services of two men. Accordingly, several devices have been developed and are known in the prior art for testing various electrical characteristics of multi-conductor cables. For example, Patent No. 3,178,639 issued to Hillman discloses a testing system and device which tests cables for leakage and continuity. Other devices which provide tests of various electrical characteristics are disclosed in Patent Nos. 3,287,633, Mollo; 3,265,968, Bilodeau; 2,983,869, Schmidt; 2,902,642, Voegtlen; 2,830,264, Wittman and 2,810,881, Daily. Generally speaking, however, the devices of the prior art either give an incomplete test of the cable or are insufficiently flexible for general testing use where a large variety of cables are to be inspected. The present invention is directed to a highly flexible cable testing device which will fully automatically test a cable for continuity, shorts, and cross connections and which is adapted for semi-automatic testing of cables where this additional flexibility in testing is desired.

SUMMARY

The following are features, characteristics, and objects of the present invention. It is an object of the present invention to provide a multi-conductor cable testing device which, when connected to the respective ends of the multi-conductor cable to be tested, fully automatically tests each conductor connector of the cable for continuity, i.e. interconnection to the corresponding conductor connector at the other end of the cable, shorts between the connectors, and cross connections between different conductor connectors at the respective ends of the cable.

A circuit system which includes an AND circuit for connection to one end of the conductor connectors, a second AND circuit for connection to the other end of the circuit connectors and an OR circuit for deriving a signal when a signal is derived by either of the AND circuits to indicate a short between at least two conductor connectors on one end of the cable also constitutes an object of the invention.

A sequencing testing circuit for multi-conductor cables which sequentially applies a voltage to the respective ends of the conductor connectors in the cable and derives a signal from the individually applied voltage to stop the sequencing circuit system when a conductor connector at one end of the cable is not properly connected to the corresponding connector at the other end of the cable, and for giving an indication corresponding to the particular connector which is defective, comprises an additional object of the invention.

An automatically sequencing testing device which simultaneously gives an indication corresponding to individual non-corresponding connectors at respective ends of the cable when said connectors are improperly inter-connected comprises yet an additional object of the present invention.

A sequencing cable testing device having provision for automatically sequentially applying a test voltage to at least one end of individual conductor connectors on a cable and also having provision for semi-automatically sequentially applying a test voltage to the individual conductor connectors on at least one end of the cable under the selective control of an operator constitutes an important object of the present invention.

A novel group sequencing arrangement wherein a multiplicity of individual switches are arranged into a plurality of physically grouped switches and into a second plurality of electrically grouped switches for providing an increased number of switches in the physical location required for a fractional number of said switches constitutes a highly significant feature and object of this invention.

The provision of a method for testing electrical cables which comprises the steps of sequentially applying a voltage between the corresponding individual connectors on the ends of the cable, deriving a first sense signal when the voltage appears on the one end connector of the individual conductors, deriving a second sense voltage when the second voltage appears on the other end conductor of the corresponding individual connector, controlling the derivation of the first sense signal by the second sense signal to prevent the first sense signal from being derived when the second sense signal is being derived and controlling the sequential application of voltage by the first sense signal to stop the sequential application of the voltage when the first sense signal is being derived also constitutes an important feature and object of the invention.

An additional object comprises the additional method steps of deriving a first short signal when a voltage appears between at least two conductors on one end of the cable, deriving a second short signal when the voltage appears on at least two individual connectors at the other end of the cable and controlling the sequential application of voltage by the respective short signals to stop the sequential application of the voltage when a short signal is being derived.

Specific circuits, combinations of components and circuits, and circuit systems for accomplishing these and other desirable objects and ends also constitute important objects of the present invention.

BRIEF DESCRIPTION OF THE DRAWING

FIGURE 3 is a schematic diagram of a preferred embodiment of one signal deriving and sensing system of the cable inspection device which derives signals when a fault is detected in the cable under inspection.

FIGURE 4 is a schematic diagram of the sequencing system of the present invention which is used in cooperation with the sensing circuitry of FIGURE 3.

FIGURE 5 and FIGURE 6 are schematic diagrams showing the interconnection of a group sequencing system which constitutes a preferred embodiment of the present invention.

The following description and reference to the drawings constitutes a preferred embodiment of the present invention and is intended as illustrative of the design, construction, and operation of the present invention; however, it will be understood that the description is not intended in the limiting sense and that the invention would encompass circuits and circuit systems which would perform equivalent functions.

Figure 1:
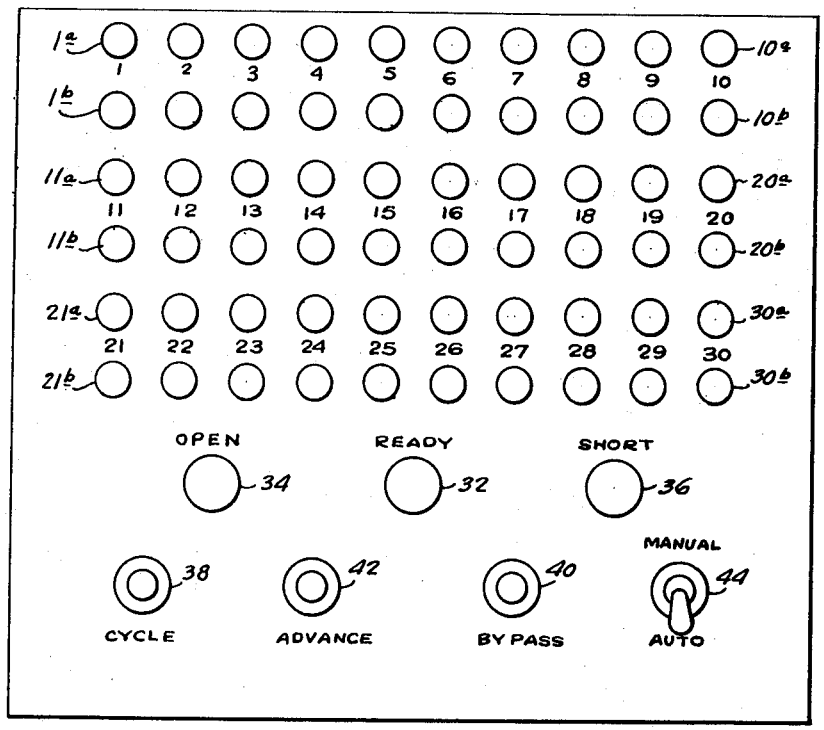
FIGURE 1 is a front view of a signal and control panel of a housing which may typically enclose the circuits and components of the cable inspection device of this invention.

FIGURE 1 shows an illustrative embodiment of a control and indication system which may be used with the present invention. Pairs of lights, numbered 1 through 30, are provided for each conductor of the cable to be tested. As will be seen hereinafter, one light of each pair is connected with the respective ends of the cable conductor to be tested and identifies the particular conductor under test or the particular conductor in which a defect may exist. Obviously, the number of conductors may be decreased or increased as the particular requirements may demand. The embodiment of the invention as described herein includes means for testing 30 conductors of a multi-conductor cable sequentially but by repetition of components and circuits any number of conductors may be tested. As will also be described hereinafter, the preferred sequencing system embodies three sets of ten conductor testing circuits and means for sequencing the groups of testing circuits and for sequencing the individual conductors under test. It will be realized, however, that a similar system using more or less groups of more or less than ten conductors may be used as is desirable under the particular circumstance. For example, it would be convenient to modify the present invention to test 100 conductors by providing five groups of 20 conductor test circuits. In this case, it would be obvious that the indicating system would be varied to accommodate the number of conductors to be tested.

Indication lamps such as a READY lamp 32 which indicates that the cable has been tested and is electrically correct, an OPEN lamp 34 which indicates that one or more cable connectors are improperly connected to the cable connector at the other end of the cable or are not located at all have been located, and a SHORT indicator 36 which indicates that at least two connectors on one end of the cable are electrically interconnected. The device may be controlled by CYCLE push button 38, which, when depressed, sensed the sequencing system in motion and automatically sequentially tests each of the individual conductors. A BY-PASS push button 40 is provided where a cable of less than 30 conductors is to be tested. This by-passes the tests on the conductors in excess of the number of which the cable actually contains and returns the device to its ready position.

Where it is desired to test the conductors individually, such as by bending, twisting, or otherwise manipulating the cable to locate intermittent opens or shorts, an ADVANCE button 42 is provided which advances the sequencing system a single step at a time when the selector switch 44 is in the MANUAL position.

Figure 2:
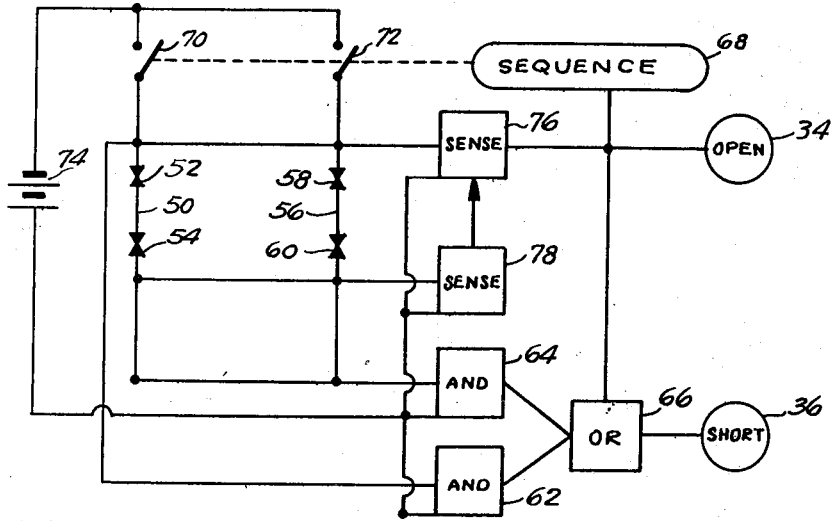
FIGURE 2 is a block functional diagram of the cable inspection device of this invention.

The operation of the device may be generally understood by reference to FIGURE 2. As shown in FIGURE 2, only two conductors are under test. A conductor 50 is connected at its respective ends 52 and 54 and a conductor 56 is connected at its respective ends 58 and 60 into the cable inspection device using conventional cable connectors such as Amphenol connectors, Cannon connectors or equivalent connectors. Obviously, any desired connector system may be used, but it is clearly desirable to have a plurality of connector systems available if it is desired to test a variety of cables having diverse connectors thereon. Once the cable has been connected to the inspection device, it will be seen that an AND circuit 62 is connected to the ends 52 and 58 of the respective conductors and an AND circuit 64 is connected to the ends 54 and 60 of the respective conductors 50 and 56. The AND circuits 62 and 64 derive a signal only when at least two of the connectors are electrically interconnected, or shorted. The output of the AND circuits 62 and 64 is coupled to the OR circuit 66 which derives a signal and gives an indication at indicator lamp 36 whenever a short is detected by either AND circuit 62 or AND circuit 64. The OR circuit 66 also acts to control sequence circuit 68 which sequentially individually closes switches 70 and 72 to apply voltage from battery 74 to the connectors 52 and 58 at the ends of conductors 50 and 56. If during the sequencing operation a short is detected by the AND circuits 62 and 64 and OR circuit 66, the sequence system 68 will be stopped until the advance switch 42 is actuated.

Sequence circuit 68 may also be stopped if, when a voltage is applied through switch 70 to connector 52, connector 52 is not connected to the connector 54 through conductor 50 since, when a voltage is applied to connector 52, a signal is derived by the SENSE circuit 76. If a signal is also derived by SENSE circuit 78, the SENSE circuit 76 is deactuated and the sequence system continues to operate and opens switch 70 and closes switch 72. If, however, connector 52 were not connected properly through conductor 50 to connector 54 SENSE circuit 78 would not derive a signal and SENSE circuit 76 would control sequence system 68 to stop the sequencing of switches 70 and would give a signal at the open indicator 34.

The individual indicator lamps shown in FIGURE 1 numbered from 1 to 30, are not shown in FIGURE 2 for purposes of clarity. It will be understood, however, that the individual indicator lamps are interconnected with the SENSE circuits 76 ad 78 to identify the particular circuit under test or the particular circuit in which a defect, such as a short or open, has been located. This interconnection is described in detail with reference to FIGURE 3.

It will be understood that the operation of the inspection device as described with reference to FIGURE 2 is approximately correct but is not intended in the limiting sense, but rather is intended as an aid to understanding the overall combinational features and importance of the invention which will now be described with reference to FIGURES 3 through 6.

FIGURE 3 is referred to particularly for an understanding of the AND circuits 62 and 64, the OR circuit 68 and the SENSE circuits 76 and 78. FIGURE 3 shows a first SENSE system shown generally at 100, a second SENSE system shown generally at 200, an interconnection circuit with the sequence system shown generally at 400 and the short detection system including the AND circuits and the OR circuit shown generally at 300. One SENSE system such as that shown generally at 100 and as shown generally at 200 is provided for each conductor of the cable which is to be tested. SENSE systems 100 and 200 are shown but it will be realized that an additional 28 identical SENSE systems would be provided in the present embodiment of the invention but are omitted from the drawing for purposes of clarity and to make the description and the drawing more concise. Each of these circuits would be identical with the first sensing system shown generally at 100; the sensing system shown generally at 200 being the last in the sequence.

SENSE system 100 includes conductor connectors 102 and 104 for interconnection with the conductor to be tested 106. As previously pointed out, the connectors 102 and 104 would conventionally be part of a larger plug of any commercial or desired construction. Sensing system 100 includes, connected to connector 102, a resistor 108 in series with an indicator lamp 1a, as shown in FIGURE 1, and a resistor 110. A similar circuit comprising resistor 112, indicator lamp 1b and resistor 114 is connected to the other end of the conductor 106 at connector 104. Now, when a voltage is applied through sequencing switch 500-1, in a manner to be described hereinafter, to the connectors 102 from the −108 volt DC source, a voltage will then appear through resistor 108 and indicator lamp 1a across resistor 110 to the base of a switching transistor 118. The application of the voltage developed across the resistor 110 causes transistor 118 to conduct through resistor 120 and the negative 6.2 volt DC source to thereby effectively ground point 122 which, as will be described hereinafter, will stop the sequencing system. If the sequencing system is thereby stopped, the indicator lamp 1a will remain lit indicating which conductor is under test and where the defect has been located.

If, however, the voltage is also applied from the −108 volt DC source through switch 500-1, connector 102, conductor 106 and connector 104, i.e. when the connectors 102 and 104 and conductor 106 are properly connected, to resistor 112, indicator lamp 1b and across resistor 114 a voltage is also applied to the base of transistor 124, and transistor 124 will conduct, thereby effectively shorting the base of transistor 118 through diode 126 to the positive 6.2 volt DC source. This will prevent transistor 118 from conducting, consequently, the control point 122 will not be grounded and the sequence circuit will not be controlled. Thus, the testing device will continue to sequence by opening switch 500-1 and closing the next switch in sequence 500-2, not shown in FIGURE 3. It will be seen, then, that the sense circuit 76, FIGURE 2, corresponds generally to transistor 118 and its associated circuitry and the sense circuit 78 corresponds generally to transistor 124 and its associated circuitry. During the sequencing steps when switch 500-1 is closed, indicator lamps 1a and 1b will momentarily flash on and off if the conductor and the conductor connectors 102 and 104 are properly interconnected and the next circuit in sequence will then be tested. If, however, voltage is not applied through the conductor 106 and the connector 104, indicating an open circuit, the indicator lamp 1a will remain on and the sequencing circuit will be stopped in that position, as will be described hereinafter.

A voltage divider circuit comprising resistors 128 and 130 is also provided with an interconnection at point 132 to the manual-automatic selector switch which will be described hereinafter.

Typically, the transistors used in this circuit, transistors 118 and 124, may be type 2N404 or equivalent. Resistors 108 and 112 may typically have a value of 47K, resistor 110 and resistor 130 may typically have a value of 10K, resistor 114 may have a value of 3.3K, resistor 120 may have a value of 1K and resistor 128 may typically have a value of 100K. Of course, different voltages, different types of transistors, and different values of resistors may be selected to give an equivalent circuit.

A parallel and equivalent SENSE system is also shown generally at 200 which may comprise connectors 202 and 204 for connection to a conductor 206 and which may be of a conventional type and would conventionally be part of a multi-connector plug as previously described. The sensing system comprises a resistor 208 in series with an indicator lamp 30a and a resistor 210. A circuit comprising resistor 212, indicator lamp 30b and resistor 214 is connected between connector 204 and the positive 6.2 volt DC source.

When a voltage of 108 negative volts DC, typically, is applied through switch 500-30 a signal is derived through resistors 208 and indicator lamp 30a across resistor 210 to the base of switching transistor 218 and through resistor 120 previously described in connection with sensing system 100 to the negative 6.2 volt DC source. This applies a control voltage to point 222 which controls the sequencing system to stop the sequencing before the voltage has been removed from the sensing system 200 by the opening of switch 402 as will be described.

If, however, connector 202 and connector 204 are properly connected through conductor 206 a signal will be derived through resistor 212, indicator lamp 30b across resistor 214 and applied to the base of transistor 224 which effectively shorts the base of transistor 218 through transistor 224 and diode 126 to the positive 6.2 volt source which prevents transistor 218 from conducting, thereby preventing control of the sequence system to stop the sequencing action in the same manner as the SENSE system 100 operates. Of course, in the particular embodiment there would be 28 intervening SENSE circuits which are not shown for purposes of clarity but would operate in the same manner. Any number of SENSE systems could be used, however. It will also be understood that the types of components and values of components, as described with reference to system 100, may similarly be used with respect to system 200 and the intervening systems.

Sensing system 200 also includes a voltage divider circuit which comprises resistor 228 which is connected at point 132 to resistor 130. Automatic-manual selector switch 44 is connected to point 132 of the voltage divider circuit and in the manual position, the closed position, would apply a voltage to the base of transistor 232 across resistor 234. When the voltage is applied from the negative 108 volt DC source through resistor 128, or resistor 228, or the analogous resistor of any of the intervening sensing systems across resistor 234 to the base of transistor 232, transistor 232 conducts, effectively grounding point 122 which is equivalent to point 222 which, as previously stated, operates the sequence system to stop the sequencing of the switches 500-1, 500-30, etc. Thus, it will be seen that transistor 232 is generally electrically equivalent to transistors 118 and 218. It will also be seen that the equivalent of transistors 124 and 224 is not connected to transistor 232; therefore, when switch 44 is in the closed manual position the sequence system will be controlled and the sequencing stopped even if the conductor connectors and the conductor are properly interconnected. Means are provided in the sequence circuit interconnection system shown generally at 400, to be described, for overriding transistor 232 temporarily to advance the sequence system a step at a time.

Reference is now made to the short detection system shown generally at 300. As previously stated, the short detection system includes a first AND circuit which comprises resistor 302 connected to the connector 102 in sensing system 100, resistor 304 interconnected with connector 202 in sensing system 200 and analogous resistors in the other sensing systems which are not shown for clarity. Voltage will be applied from the negative 108 volt DC source through either switch 500-1 or switch 500-30 or the analogous switch on the intermediate sensing systems to the base of transistor 306 across a resistor 308. Typically, resistors 302 and 304 and the analogous resistors may have a value of 100K and resistor 308 may have a value of 4.3K. These values are selected with consideration to the voltage as applied but in the design of an equivalent system it will be understood that the values of resistors 302, 304, the analogous resistors in the other sensing systems and resistor 308 are selected such that transistor 306 will conduct sufficiently to derive a signal which would be applied to point 310 only when a voltage is simultaneously applied to two of the resistors 302, 304 or the equivalent resistors in the intermediate sensing systems. Thus, transistor 306 comprises an AND circuit in that at least two parallel signals must be applied to the base thereof before it derives a signal. In operation, if connector 102 were shorted to connector 202, when switch 500–1 was closed to start the sequence, the negative 108 volt DC signal would be applied both to resistor 302 and resistor 304, thereby actuating the AND circuit comprising transistor 306. It will also appear that indicator lamps 1a and 30a will simultaneously be lit to thereby identify the connectors which are shorted together.

A second AND circuit comprises resistors 322 and 324 which are connected, respectively, to connectors 104 and 204 at the other end of the cable which is being tested. The negative 108 volt DC signal is applied through resistor 322 or resistor 324, depending on whether switch 500–1 or switch 500–30 are closed, to the base of transistor 326 across resistor 328. The AND circuit which comprises transistor 326 operates in a manner similar to that described with respect to transistor 306. That is, when a signal is simultaneously applied through resistors 322 and 324 as a result of a short between connectors 104 and 204, the AND circuit comprising transistor 326 is energized to derive a signal which is applied to point 310.

Voltage for both transistors 306 and 326 is provided through resistor 330 from a negative 6.2 volt DC source.

Reference is made now to point 310 which is the control point for the OR circuit. As will be seen, a forward biasing voltage from the negative 6.2 volt signal is applied to resistor 330 and resistor 332 across resistor 334 to the base of transistor 336. When the base of transistor 336 is effectively grounded either through transistor 306 or transistor 326 and resistor 332, transistor 336 ceases to conduct, thereby controlling the sequence circuit system as will be described hereinafter.

The values of the resistors 322 and 324 may be selected as 100K and resistor 328 may have a value of 4.3K in the preferred embodiment but, as previously explained, the values of these resistors must be selected so as to energize transistor 326 only when a signal is applied through two resistors simultaneously. Resistor 330 may have a value of 1K, and the value of resistors 332 and 334 may be 2.2K and 10K, respectively.

The interconnection system 400 will be discussed with reference to FIGURE 3 and to the sequencing system as shown generally at 500 in FIGURE 4.

As has been explained, once the sequencing system has been placed in operation it will continue to operate, that is sequentially applying a voltage to the individual conductors, until a defect such as a short or open is detected with respect to one of the conductors. The sense system 100, 200 or the intermediate sense system which is effected, or the short detection system 300, then operates through interconnection system 400 to control the sequence system 500 to stop the sequencing action.

Consider, first, the situation wherein an open is detected by one of the sense systems thereby causing points 122 and the equivalent point 222 to be grounded either through transistor 118 or transistor 218. When this occurs, transistor 402 which is normally forwardly biased through resistor 120 from the negative 6.2 volt DC source and resistor 404 will cease to conduct thereby deenergizing relay 406 which is bypassed for protection of transistor 402 by a diode 408. Transistor 402 is, in effect, then a switch in the circuit between the negative 12 volt DC source and relay 406.

When relay 406 is deenergized, contacts 406A, FIGURE 4, are opened thereby deenergizing relay 502. Deenergization of relay 502 opens contacts 502A to thereby deenergize motor 504 which is operably connected to a rotating arm 506 which carries a permanent magnet 508 on the end thereof. In the preferred embodiment, it is the rotation of arm 506 by motor 504 which sequentially individually applies voltage to the respective conductors. This sequencing system will be described in greater detail hereinafter and it is sufficient for present purposes to indicate that motor 504 is of the type which has a stop torque to thereby permit substantially instantaneous stopping of the motor by control of the voltage applied thereto. Cramer type 117H is satisfactory.

Returning to the interconnection system 400 as shown in FIGURE 3, it will be seen that if the AUTOMATIC-MANUAL switch 44 is in the MANUAL position, closed, the base of transistor 402 will be grounded through transistor 232 and resistor 404. In this position, the sequence system does not automatically sequence from one conductor to the next but an over-ride or advance system must be provided. The advance system comprises advance switch 42 which applies a negative 6.2 volt DC signal through a time constant network comprising capacitor 410 and resistor 412 and through resistor 414 to the base of transistor 402 to thereby forwardly bias transistor 402 to energize relay 406 closing contacts 406A and permitting the sequence system to continue its cycle. The voltage applied through resistor 414 is sufficient to overcome the grounding effect through either transistors 118, 218, or 232. Thus, once a defect has been located, and the defective conductor has been noted for future correction, it is only necessary to push the advance button 42 to permit the sequence system to continue its sequencing action. In the manual position, it is necessary to push the advance button 42 each time it is desired to advance the voltage from one conductor to the next. In this manner, as much time as is desired is available for twisting, bending, or otherwise manipulating the cable to determine if there are intermittent shorts or opens in the cable connection.

The sequence control or interconnection system 400 also includes a relay 416 which is bypassed by a diode 418 to protect transistor 336, which controls the actuation of relay 416 by opening or closing the circuit from the negative 12 volt DC source through the relay to ground.

As previously explained, transistor 336 is normally forwardly biased by the negative 6.2 voltage signal applied through resistor 330 and resistor 332 to the base thereof. When the base of transistor 336 is effectively grounded either through transistor 306 or transistor 326, transistor 336 ceases to conduct and relay 416 opens. This opens the contact 416A, FIGURE 4, and deenergizes relay 512 thereby operating contacts 512A to stop the motor in the manner previously described with respect to contacts 502. It will be apparent, then, that either an open or a short will control the sequence system to stop the sequencing action thereof. To continue the sequence action following identification of the defective conductor, it is necessary only to press advance button 42 which applies a negative 6.2 volt DC signal through a time constant circuit comprising capacitor 420 and resistor 422. This forwardly biases transistor 336 to return it to the conducting state.

The sequence control for interconnection system 400 also includes resistor 424 which serves to develop the voltage on the base of transistor 402 and acts as a voltage divider in cooperation with resistors 404 and 414.

Turning now to the sequence system and to FIGURE 4 in particular, it will be seen that the open indicator lamp 34 is connected in series with a resistor 514 and contacts 502B which are normally closed and close automatically when relay 502 is deenergized to thereby give an indication that an open has been found in one of the circuits under test. Similarly, short indicator lamp 36 is in series with a resistor 516 and with contacts 512B of relay 512. In a similar manner, contacts 512B are normally closed and when relay 512 is deenergized, automatically closed to energize short lamp 36.

It will also be seen that bypass switch 40 is electrically in parallel with the contacts 502A and 512A of relays 502 and 512, respectively, and may be used to bypass these contacts when a cable having fewer than, in the particular embodiment under consideration, 30 conductors is being tested. Thus, if the cable includes only, for example, 18 conductors, the inspection device will operate normally with respect to the 18 conductors, but when it reaches the 19th connection it will show an open and will stop the cycle. By holding switch 40 closed while the sequence system cycles past the remaining 12 connectors, which requires only a few seconds, the sequence system is returned to its ready position.

Reference is now made to FIGURES 4, 5 and 6 for a discussion of the sequence system of this invention.

In its simplest form, the sequence system of this invention would consist of a motor driven arm carrying a magnet past a plurality of dry reed switches, the reed switches being arranged circularly and connected in the sequence in which it was desired to apply the voltage to the corresponding conductors. For a small number of conductors, this simple system is perfectly satisfactory. However, when the number of conductors becomes increasingly large, an inconvenient amount of space becomes necessary for mounting the reed switches. The problem arises not because of the physical size of the reed switches, entirely, but rather because of the space which must be provided between adjacent reed switches to permit the sequence motor to stop adjacent one of the reed switches without the magnet carried by the arm actuating more than one reed switch. Thus, if the reed switches were placed too closely in proximity to each other, the permanent magnet, 508, carried by the arm, would tend to energize more than one of the switches at a given time an erroneous indication.

The difficulties encountered in providing an adequate number of switches have been overcome in the present invention by the combination of a group sequencing system and a plurality of group switches. In the typical example which follows, there are physically ten groups of three reed switches which are connected electrically in three groups of ten reed switches. Obviously, the number of groups and the number in the group is a matter of choice and may be varied to fit the particular circumstances and requirements. As previously pointed out, 20 groups of five switches may conveniently be used where 100 conductors are to be tested. With reference now particularly to FIGURE 4, it will be seen that there are ten groups of reed switches, three in each group, arranged in a circle to be swept past by the magnet 508 on the arm 506 as motor 504 rotates. The first group includes reed switch 500–1, reed switch 500–11, and reed switch 500–21. The last group would include reed switch 500–10, reed switch 500–20, and reed switch 500–30. The intermediate groups are similarly arranged with three reed switches numerically designated one decade apart in each group. For purposes of clarity, not all the numbering is shown in the drawing.

As described, arm 506 carries magnet 508 past the first group of reed switches which includes reed switch 500–1. As will be described, no voltage is applied to reed switches 500–11 and 500–21 so that, for all practical purposes, only reed switch 500–1 is being actuated by the magnet on 508. Should a defect be found with respect to the first conductor, there is sufficient space between the first group of switches and the second group of switches to permit the arm 506 to come to a stop before the switches of the second group are actuated by magnet 508. If no defect exists with respect to the conductor No. 1, the arm will continue to sweep carrying magnet 508 past the second group of reed switches and the third and so on until either a defect is located or the first ten conductors have been tested and found to be correctly connected. In a manner to be described, the actuating voltage is then transferred from the first ten circuits to the second ten circuits comprising the circuits including switches 500–11 through 500–20. As the arm 506 carrying magnet 508 sweeps past the first group of switches, reed switch 511 is closed by the action of magnet 508 and conductor No. 11 is tested. Similarly, conductor No. 12, No. 13, etc., to conductor No. 20 is tested in the second circular sweep of arm 506.

The actuating voltage is again transferred this time to the switches 500–21 to 500–30 and the third set of ten conductors is tested in the same manner. Thus, it will be seen that 30 conductors may be interconnected using 30 reed switches in substantially the same physical space as is required for the placement of 11 reed switches since the same space between the switches must be provided whether the group consists of one switch or three or more switches.

Reference is now made particularly to FIGURES 4, 5 and 6 which show the sequencing and transfer circuits.

As previously pointed out, the 30 switches which are physically arranged in ten groups of three switches each are electrically connected in three groups of ten switches each, as shown in FIGURE 5. Switches 500–1, 500–2, etc., to 500–10 are electrically connected in parallel while switches 500–11, 500–12, etc., to 500–20 and 500–21, 500–22, etc., to 500–30 are respectively connected in groups of ten switches electrically in parallel.

With reference now to FIGURE 6, when cycle switch 38 is momentarily depressed, transistor 518 is forwardly biased by the voltage aplied through resistor 520 and begins to conduct energizing relay 522 which is bypassed by diode 524 for the protection of transistor 518. This opens contacts 522A, FIGURE 4, and removes the energizing voltage from READY indicator lamp 32 and resistor 526. Energization of relay 522 also closes contact 522B, FIGURE 6, which completes a shunt holding circuit past the cycle switch 38 to maintain relay 522 in energized condition. Motor 504 is energized when relay 522 becomes energized by the closing of contacts 522C, FIGURE 4, which begins the sweep of arm 506 carrying magnet 508 past the reed switches 500–1 to 500–30. As best shown in FIGURES 5 and 6, however, the negative 108 volt DC potential is applied only to switches 500–1 to 500–10 through contacts 528A, which is normally closed, of relay 528, FIGURE 6, and is not applied to switches 500–11 to 500–30 since contact 528B, FIGURE 5, is normally open. Consequently, electrically only the first ten switches, 500–1 to 500–10, sequentially apply a voltage to the respective conductors during the first cycle of the arm 506. As magnet 508 swings adjacent switches 500–1 to 500–10 it momentarialy closes these dry reed switches and, if no defect is located, moves on to the next in sequence.

When arm 506 moves past switch group including switches 500–10, 500–20, 500–30, it passes switch 530 which is a transfer switch and which electrically is shown in FIG. 6 in series with an RC time constant circuit consisting of resistor 532 and capacitor 534 and resistor 529 This causes the closing of switch 530, which is connected through contacts 528C to the control electrode of silicon controlled rectifier 536. As capacitor 534 charges the resistor 538, resistor 540 and resistor 529, a positive signal is developed across resistor 538 and resistor 540 and applied to the gate electrode of silicon controlled rectifier 536 causing it to turn on. When it turns on or begins to conduct, it energizes relay 528, whose solenoid is bypassed by diode 542 to protect silicon controlled rectifier 536. Of course, once the silicon controlled rectifier has been turned on, it will remain in the conducting condition until its DC supply voltage is removed. The time constant of capacitor 534, resistor 532, resistor 529, and resistor 540 is short compared with the operating time of relay 528 so that capacitor 534 is completely charged before the contacts of relay 528, 528C operate. The operation of relay 528 also closes contacts 528D but by the time the contacts 528D are closed, capacitor 534 is fully charged and, since resistor 532 is a high resistance, the voltage applied to the gate terminal of silicon controlled rectifier 546 is not enough to cause rectifier 546 to turn on. Arm 506 cycles past the ten groups of switches, with switches 500–11 to 500–20 being electrically in the circuit because when relay 528 is energized contacts 528A open and contacts 528B close applying a voltage through contacts 544A of relay 544, shown in FIGURE 5. Contacts 544B are open and consequently no voltage is applied to switches 500–21 to 500–30.

As arm 506 completes its cycle and swings past switch 530 again, switch 530 again closes and this time applies the positive voltage developed across the RC time constant circuit across resistor 545 to the control electrode of silicon controlled rectifier 546 which energizes relay 544, which is bypassed to protect silicon controlled rectifier 546 by diode 548 and which actuates contacts 544A and 544B, FIGURES 5 and 6, to remove the voltage applied to switches 500–11 to 500–20 and apply it to switches 500–21 to 500–30.

Contact 544C is also closed. As arm 506 swings past the ten groups of three switches it sequentially applies a voltage to the conductors corresponding to numbers 21 through 30 in the manner previously described with respect to conductors corresponding to numbers 1 through 10 and 11 through 20. As it passes the last group of three switches, switches 500–10, 500–20, and 500–30, it again passes switch 530 but switch 530 is not electrically connected now to transfer. It also passes switch 550 which, now, because of the last transfer which closed contacts 544C is connected in series with an RC circuit which includes resistors 552, and 554 and capacitor 556. The current flow through the RC circuit when switch 550 is closed and through resistor 520 develops a positive potential which is applied to the base of transistor 518 across resistor 558. Transistor 518 is reverse biased long enough to allow relay 522 to release. The contacts on relay 522 transfer, the motor stops and the READY lamp lights indicating that the test cycle has been completed and that the device is ready for removal of the cable and replacement with another cable to be tested.

Switch 550 only operates after all three decades of the cycle have been completed, first because contact 544C is normally open until the third group of switches is placed in the circuit by the closing of relay 544. Even after relay 544 has been closed, a charge does not develop across resistor 552 because of the RC time constant in time for switch 550 to apply a sufficient charge to the base of transistor 518 immediately after contacts 544C have closed. Thus, while switch 550 closes each time arm 506 cycles, it is only after contacts 544C have been closed long enough to charge capacitor 556 that the closure of switch 550 is electrically effective to effect a transfer.

The individual connector sequence switches 500–1 to 500–30, the transfer switch 530 and switch 550 may be mounted by any conventional means in a generally circular configuration, as shown in FIGURE 4, such as by a mounting board or wafer 560 being held in place by clips or by adhesive material not shown for purposes of clarity.

OPERATION

While it is believed that the operation of the inspection device will be understood from the foregoing, the following concise description of the invention as applied to the detailed drawings and the diagram is given to assist in the understanding of the device.

At the outset, after the inspection device has been turned on, the cable is connected to the test device according to conventional practice using conventional cable connectors. The CYCLE button 38 is depressed which energizes relay 522 closing contacts 522C thus energizing the motor 504. As motor 504 carries arm 506 and magnet 508 past switches 500–1 to 500–10 the first sense circuit 100 tests the conductor 106 for continuity between the connectors at its ends and for shorts between the connectors at the ends of the cable. If a short should appear between connector 102 and an adjacent connector on the same end of the cable, the AND circuit including transistor 306 would be energized which would in turn ground the base of OR circuit transistor 336 opening relay 416 and stopping the motor. A short indication would result. Similarly, if a short should appear between connector 104 at the other end of the cable, AND circuit including transistor 326 would give a similar short indication and stop the cycle. The cycle can be restarted by depressing ADVANCE button 42 temporarily.

If, on the other hand, an open circuit appears between connectors 102 and 104, transistor 118 will conduct grounding the base of transistor 402 giving an open indication and stopping the cycle. If a continuous circuit appears between connector 102 and connector 104 transistor 124 would prevent energization of transistor 118 and the open indication will not appear and the cycle will not be stopped.

In either case, that is whether a short appears or whether an open appears between connectors 102 and 104, lamp 1a will indicate the particular conductor under test in which the defect has been located.

Consider the possibility that the connector 102 may be incorrectly cross-connected to the improper connector at the other end of the cable, for example, connector 102 may be cross-connected to connector 204 at the other end of the cable. If this occurs, an open indication will be given and stop the cycle since transistor 118 will ground the base of transistor 402. Indicator lamp 1a will indicate a defect in the circuit of conductor 106. In addition, since the voltage will be applied from connector 102 through the incorrectly connected conductor to connector 204 a voltage will be applied across indicator lamp 30b which will also light indicating which two connectors have been cross-connected. Transistor 218 will be deactuated but since there is no actuating voltage being applied through indicator lamp 30a this will be of no effect.

If no defect appears in the first ten conductors, transfer switch 530 will actuate relay 528 transferring the voltage to the next ten conductors. Similarly, when the next ten conductors have been inspected, transfer switch 530 will actuate relay 544 and transfer the voltage to the next ten conductors. Upon the inspection of the last ten conductors, switch 550 will transfer the voltage back to the original conductors and reset the inspection device in ready position for receiving the next cable to be tested.

This invention has been explained, and disclosed, with respect to a specific embodiment, using specific circuitry and specific components and groups and combinations of components and circuits; however, it will be realized that equivalent circuits and combinations of circuits and components may be used to accomplish the same purposes in substantially the same manner without departing from the scope of the invention. In addition, while the invention has been abstracted, summarized and disclosed with respect to a specific embodiment to aid in the understanding of the invention and to assist in the practice of the invention, it will be understood that the disclosure and the circuitry and combinations of circuitry and components disclosed are intended as merely exemplary of a preferred embodiment of the invention and not in the limiting sense. Accordingly, it is intended that the invention will be limited only by the scope of the following claims.

I claim:
1. Apparatus for testing a multiconductor cable for continuity, shorts and proper interconnection of the individual conductors in said cable with end connectors thereon comprising the combination of:
  a voltage source;
  means for automatically applying voltage sequentially from said source to end connectors of selected individual conductors at one end of said cable;
  circuit means including a first AND circuit, means for connecting said first AND circuit to a plurality of connectors at one end of the individual conductors, and means connecting said first AND circuit to said voltage source, whereby said first AND circuit derives an output signal only when a voltage appears on at least two individual conductor connectors at said end because of a short circuit between said end connectors, said voltage being applied from said at least two connectors to energize said first AND circuit;

circuit means including a second AND circuit, means for connecting said second AND circuit to a plurality of connectors at the other end of the individual conductors, and means connecting said second AND circuit to said voltage source, whereby said second AND circuit derives an output signal only when a voltage appears on at least two individual conductor connectors at said other end because of a short circuit between said individual connectors, said voltage being applied from said at least two connectors to energize said second AND circuit; and circuit means for stopping the automatically sequencing voltage applying means when the connector of an individual conductor at one end is not connected to the connector of said conductor at the other end, including first and second SENSE circuits, said first SENSE circuit being connected to the connector at one end of said circuit and to the output of the second SENSE circuit, said second SENSE circuit being connected to the connector at the other end of said conductor, said first SENSE circuit deriving an output signal when a voltage is applied thereto only from the connector at said one end of said conductor and deriving no output signal when a voltage is applied thereto from both the connector and said one end of said conductor and from said second SENSE circuit, said automatically sequencing voltage applying means being connected to said first SENSE circuit and being sensitive to the output signal therefrom such that said output signal prevents further sequencing of said voltage applying means.

2. The apparatus of claim 1 further comprising circuit means including an indicating device and circuit means interconnecting said indicating device and said AND circuits for energizing said indicating device from the output signal on either of said AND circuits upon the occurrence of a short circuit between individual connectors at either end of said cable.

3. The apparatus of claim 1 further comprising means responsive to the output signal of said first SENSE circuit for being activated by said output signal for giving an indication when the connector at one end of an individual conductor under test is not connected to the connector at the other end of said conductor for thereby indicating an open circuit between the respective individual connectors.

4. The apparatus of claim 3 further comprising circuit means including an indicating device and circuit means interconnecting said indicating device and said AND circuits for energizing said device from the output signal on either of said AND circuits upon the occurrence of a short circuit between individual connectors at either end of said cable.

5. The cable inspection device of claim 4 further comprising a plurality of indicators individually connected to the respective connectors at said one end of said cable for being energized when voltage is applied to said respective connectors for indicating which of the individual connectors is under tests and for indicating shorts between the individual connectors at said one end of said cable.

6. The cable inspection device of claim 5 further comprising a second plurality of indicators individually connected to the respective connectors at said other end of said cable for being energized when voltage is applied to said respective connectors for indicating the interconnection, by the individual conductors, of the individual connectors at the respective ends of said cable and for indicating shorts between individual connectors at said other end of said cable.

7. The apparatus of claim 1 further comprising a plurality of indicators individually connected to the respective connectors at said one end of said cable for being energized when voltage is applied to said respective connectors for indicating which of the individual connectors is under test and for indicating shorts between the individual connectors at said one end of said cable.

8. The apparatus of claim 7 further comprising a second plurality of indicators individually connected to the respective connectors at said other end of said cable for being energized when voltage is applied to said respective connectors for indicating the interconnection, by the individual conductors, of the individual connectors at the respective ends of said cable and for indicating shorts between individual connectors at said other end of said cable.

9. The apparatus of claim 1 wherein the voltage applying means comprises:

a multiplicity of individually magnetically actuatable switches;

means supporting said switches in a generally circular array of a first number of physical groups, each group comprising a second number of switches, said first number times second number equaling the total number of switches for applying voltage to individual connectors;

circuit means interconnecting said switches in the second number of electrically separate groups, each said group comprising the first number of individual switches connected electrically together, said switches being so arranged that one member of each electrical group is in each physical group;

circuit means for sequentially selecting said electrically separate groups;

a magnet; and means for carrying said magnet in a generally circular path adjacent said switches, said carrying means being responsive to the output signal from said SENSE circuit for being stopped in response thereto.

10. The apparatus of claim 9 wherein said carrying means is electrically connected for being responsive to the output signal of said AND circuits for being stopped in response to said signals.

11. The apparatus of claim 10 further comprising means responsive to the output signal of said first SENSE circuit for being activated by said output signal for indicating when the connector at one end of a conductor under test is not connected to the connector at the other end of said conductor; and circuit means including an indicating device and the circuit means interconnecting said indicating device and the said AND circuts for energizing said indicating device from the output signal of either of said AND circuits.

12. The apparatus of claim 11 further comprising a plurality of indicators individually connected to the respective connectors at said one end of said cable for being energized when voltage is applied to said respective connectors for indicating which of the individual connectors is under test and for indicating shorts between the individual connectors at said one end of said cable; and a second plurality of indicators individually connected to the respective connectors at said other end of said cable for being energized when voltage is applied to said respective connectors for indicating the interconnection, by the individual conductors, of the individual connectors at the respective ends of said cable and for indicating shorts between individual connectors at said other end of said cable.

13. A cable inspection device for testing a multiconductor cable and end connectors thereof for shorts, opens and proper interconnection of individual conductors therein, comprising connector receiving means for each end connector of said cable including means for receiving individual conductor connectors thereof, means for automatically sequentially applying voltage to selected individual connectors at one end of said cable, means for sensing the voltage at said one end connector of the selected conductor, means for sensing the voltage at the other end connector of said selected conductor, said means for sensing the voltage at said one end being connected to said means for sensing the voltage at the other end connector and deriving an output signal only when voltage appears at only said one end connector of the selected conductor under test, first short circuit test means for deriving an output signal upon the occurrence of a short circuit between individual connectors at said one end of said cable, and second short circuit test means for deriving an output signal upon the occurrence of a short circuit between individual connectors at said other end of said cable, said automatically sequencing voltage applying means being connected for responding to an output signal from said means for sensing voltage at said one end connector of said selected conductor and for responding to an output signal of said first and said second short circuit test means such that upon the occurrence of a short circuit between individual connectors at either end of said cable or upon the occurrence of an open circuit between the respective end connectors of selected individual conductors further sequencing action of said voltage applying means is stopped thereby indicating the existence of a defect in the cable under test.

14. The inspection device of claim 13 wherein the first and second short circuit test means individually comprise: circuit means including an AND circuit, means connecting said AND circuit to a plurality of connectors at one end of said cable, and means connecting said AND circuit to said voltage source, whereby said AND circuit derives an output signal only when a voltage appears on at least two individual connectors at the respective end because of a short circuit between said individual connectors, said voltage being applied from said at least two connectors to energize said AND circuit to derive an output signal for actuating said sequencing voltage applying means for stopping further sequencing action upon the occurrence of a short circuit and indicators responsive to the applied voltage for showing the individual connectors between which said short circuit occurs.

15. In a cable inspection device for testing a multi-conductor cable and end conductors thereon for shorts, opens and proper interconnection of the individual conductors therein, of the type comprising connector receiving means for each end connector of said cable, including means for receiving individual conductor connectors thereof, means for automatically sequentially applying voltage to selected individual connectors at one end of said cable, means for sensing the voltage at said one end connector of the selected conductor, means for sensing the voltage at the other end connector of the selected conductor, said means for sensing the voltage at said one end being connected to said means for sensing the voltage at said other end connector and deriving an output signal only when voltage appears at only said one end connector of said selected conductor, first short circuit test means for deriving an output signal upon the occurrence of a short circuit between individual connectors at said one end of said cable, and second short circuit test means for deriving an output signal upon the occurrence of a short circuit between individual connectors at said other end of said cable, said automatically sequencing voltage applying means being connected for responding to an output signal from said means for sensing voltage at said one end connector of said selected conductor and for responding to an output signal of said first and said second short circuit test means such that upon the occurrence of a short circuit between individual connectors at either end of said cable or upon the occurrence of an open circuit between the respective end connectors of the selected individual conductor further sequencing action of said voltage applying means is stopped, the improvement wherein: the means for sensing the voltage at said one end connector of the selected conductor and the means for sensing the voltage at the other end connector of the selected conductor comprise first and second SENSE circuits, said first SENSE circuit being connected to the connector at one end of said conductor and to the output of the second SENSE circuit, said second SENSE circuit being connected to the connector at the other end of said conductor, said first SENSE circuit deriving an output signal when a voltage is applied thereto only from the connector at said one end of said conductor but deriving no output signal when a voltage is applied thereto from both the connector at said one end of said conductor and from said second SENSE circuit, said automatically sequencing voltage applying means being connected to said first SENSE circuit and being sensitive to the output signal therefrom such that said output signal prevents further sequencing of said voltage applying means, and a plurality of indicators connected respectively to the individual connectors at the respective ends of said cable, said indicators being responsive to the applied voltage for showing which individual conductor is under test and the interconnection of individual connectors at the respective ends of said cable.

16. In a cable inspection device for testing a multi-conductor cable and end conductors thereon for shorts, opens and proper interconnection of the individual conductors therein, of the type comprising connector receiving means for automatically sequentially applying voltage to selected individual connectors at one end of said cable, means for sensing the voltage at said one end connector of the selected conductor, means for sensing the voltage at the other end connector of the selected conductor, said means for sensing the voltage at said one end being connected to said means for sensing the voltage at said other end connector and deriving an output signal only when voltage appears at only said one end connector of said selected conductor, first short circuit test means for deriving an output signal upon the occurrence of a short circuit between individual connectors at said one end of said cable, and second short circuit test means for deriving an output signal upon the occurrence of a short circuit between individual connectors at said other end of said cable, said automatically sequencing voltage applying means being connected for responding to an output signal from said means for sensing voltage at said one end connector of said selected conductor and for responding to an output signal of said first and said second short circuit test means such that upon the occurrence of a short circuit between individual connectors at either end of said cable or upon the occurrence of an open circuit between the respective end connectors of the selected individual conductor further sequencing action of said voltage applying means is stopped, the improvement wherein: said voltage applying means comprises a multiplicity of individually magnetically actuated switches; means supporting said switches in a generally circular array of a first number of physical groups, each group comprising a second number of switches, said first number times said second number equaling the total number of switches for connection to individual conductors; circuit means interconnecting said switches in a second number of electrically separate groups, each said group comprising the first number of individual switches connected electrically together, said switches being so arranged that one member of each electrical group is in each physical group; circuit means for sequentially selecting said electrically separate groups; a magnet; and means for carrying said magnet in a generally circular path adjacent said switches, said carrying means being responsive to the aforesaid output signals for stopping the sequencing action.

17. A method for detecting short circuits between individual connectors at the respective ends of a multi-conductor cable, for detecting open circuits between corresponding end connectors of individual conductors of said cable, and for detecting improper conductor interconnection between individual end connectors at the respective ends of said cable which comprises the steps of:

sequentially applying a test voltage to individual connectors at one end of the cable;

deriving first and second SENSE signals from said test voltage appearing on corresponding individual connectors at the respective ends of the cable, controlling the derivation of the first SENSE signal by the second SENSE signal to prevent said first SENSE signal from being derived when the test voltage appears at corresponding connectors at both ends of said cable such that a first SENSE output signal is derived only when the test voltage appears only on the corresponding connector at said one end of said cable, and actuating an indicator with said first SENSE output signal for showing the presence of an open circuit between corresponding conductors at the respective ends of the cable;

deriving short circuit indications at the respective ends of said cable by deriving a first AND short signal in response to voltage appearing on more than one individual connector at said one end of said cable when said test voltage is applied directly to only one of said individual connectors, deriving a second AND short signal in response to a voltage appearing on more than one individual connector at the other end of said cable when the test voltage is applied through an individual conductor under test directly to only one of said individual connectors on said other end, and actuating an indicator by either of said AND short output signals for showing the presence of a short circuit between individual connectors at the respective ends of said cable;

actuating an individual indicator corresponding to each respective connector at the respective ends of said cable in response to a test voltage appearing on each individual connector at the respective ends of the cable for showing which conductor is under test and, if a short or open circuit is indicated, which connectors are shorted together, which conductor is not connected to corresponding connectors at the respective ends of said cable and for showing improper interconnection of individual conductors to individual connectors at the respective ends of the cable under test; and controlling the step of sequentially applying said test voltage by the first SENSE signal output, the first AND short signal output and the second AND short signal output such that upon the appearance of one or more of said output signals the sequential application of test voltage is stopped for permitting an operator to identify, through the use of said indicators, the defective connectors and conductors of the cable under test.

References Cited

UNITED STATES PATENTS

| | | | |
|---|---|---|---|
| 2,962,659 | 11/1960 | Neill | 324—66 XR |
| 3,182,253 | 5/1965 | Dorsch et al. | 324—51 |
| 3,246,240 | 4/1966 | Arnold et al. | 324—73 |
| 3,246,249 | 4/1966 | Boscia | 324—133 XR |
| 3,302,109 | 1/1967 | Jones | 324—73 |
| 3,354,389 | 11/1967 | Hordosi | 324—73 |
| 3,362,013 | 1/1968 | Abrahamson et al. | |

GERARD R. STRECKER, Primary Examiner

U.S. Cl. X.R.

324—51